United States Patent [19]
Sergel et al.

[11] Patent Number: 5,273,601
[45] Date of Patent: Dec. 28, 1993

[54] METHOD AND DEVICE FOR CUTTING TO LENGTH A STRIP OF TIRE BUILDING MATERIAL

[75] Inventors: Horst Sergel, Hanover; Gerd Brandes, Hemmingen, both of Fed. Rep. of Germany

[73] Assignee: Continental Aktiengesellschaft, Hanover, Fed. Rep. of Germany

[21] Appl. No.: 994,115

[22] Filed: Dec. 21, 1992

[30] Foreign Application Priority Data

Dec. 21, 1991 [DE] Fed. Rep. of Germany ....... 4142723

[51] Int. Cl.$^5$ .............................................. B29D 30/16
[52] U.S. Cl. .................................... 156/133; 156/134; 156/406.6
[58] Field of Search .................... 156/133, 134, 405.1, 156/406.4, 406.6, 110.1, 250, 266; 83/175, 451, 701; 242/56 R, 75

[56] References Cited

U.S. PATENT DOCUMENTS

| | | | |
|---|---|---|---|
| 4,738,743 | 4/1988 | Satoh et al. | 156/406.4 |
| 4,922,774 | 5/1990 | Oldeman | 83/175 |
| 5,102,490 | 4/1992 | Becker et al. | 156/406.4 |

FOREIGN PATENT DOCUMENTS 0264720 4/1988 European Pat. Off. .
0284761 10/1988 European Pat. Off. .

*Primary Examiner*—Michael W. Ball
*Assistant Examiner*—Richard Crispino
*Attorney, Agent, or Firm*—Robert W. Becker & Associates

[57] ABSTRACT

A method for cutting to length a strip of tire building material includes the step of feeding the strip of tire building material via a conveying device tangentially to a winding drum. In a further step the strip of tire building material is wound onto the winding drum by rotating the winding drum and a defined pressure is simultaneously applied with a pressure roller during winding until a length of the strip of tire building material corresponding almost to the circumference of the winding drum has been wound onto the winding drum. The rotating winding drum is then stopped and the strip of tire building material is fixed in a first location in the vicinity of a cutter bar that is positioned directly in front of the conveying device. The pressure roller is then moved from its initial position toward the cutter bar along the circumference of the winding drum to thereby tighten the strip of tire building material and fix the strip of material in a second location closely adjacent to the first location. In a final step, the strip of tire building material is cut with a cutting tool.

8 Claims, 1 Drawing Sheet

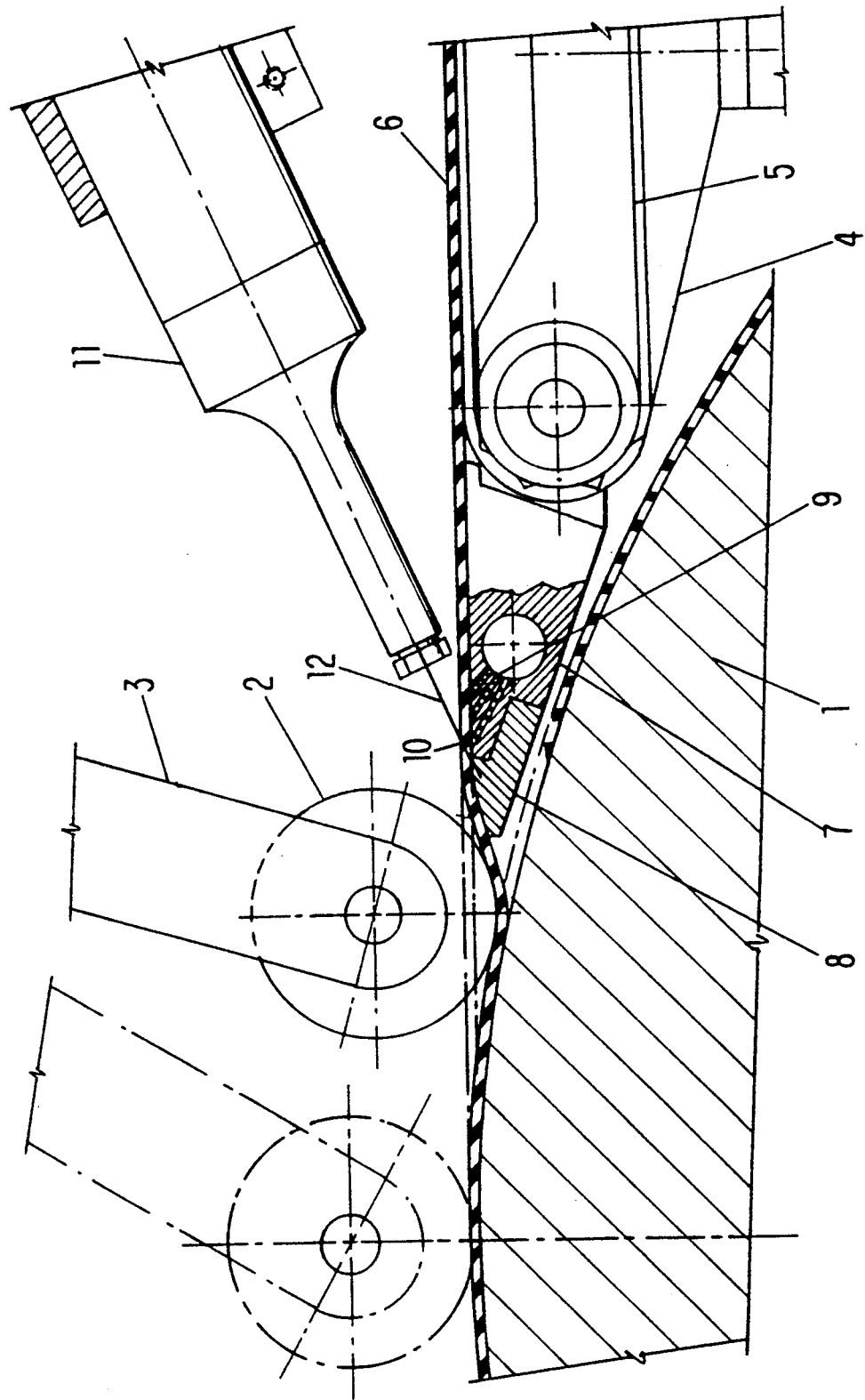

METHOD AND DEVICE FOR CUTTING TO LENGTH A STRIP OF TIRE BUILDING MATERIAL

BACKGROUND OF THE INVENTION

The present invention relates to a method for cutting to length a strip of tire building material for layers of pneumatic vehicle tires by transversely or guillotine-like cutting with a cutting tool, for example, an ultrasonic cutting tool, the strip of tire building material. The present invention further relates to a device for performing the aforementioned method.

The cutting to length of strips of material for building pneumatic vehicle tires from pretreated strips of material requires a high precision during the cutting process. The cutting process is further complicated due to the fact that the cutting edges must be oriented at angles relative to the edges of the strip in order to provide a wider overlap portion of the free ends which is especially important for strips of material that is less adhesive. Cutting devices are known in which the cutting process is carried out in a first step, and the positioning of the cut strip onto a winding drum is performed after intermediate storage. This is disadvantageous because due to varying shrinking properties relatively great length tolerances cannot be avoided.

It is therefore an object of the present invention to provide a method for cutting to length a strip of tire building material for layers of pneumatic vehicle tires in which with a continuous material feed without a precutting step a defined length of the strip of material can be produced.

BRIEF DESCRIPTION OF THE DRAWINGS

This object, and other objects and advantages of the present invention, will appear more clearly from the following specification in conjunction with the accompanying only drawing, in which an inventive device for performing the inventive method is schematically represented.

SUMMARY OF THE INVENTION

The inventive method for cutting to length a strip of tire building material is comprised of the following steps:

Feeding the strip of tire building material via a conveying device tangentially to a winding drum;

Simultaneously winding the strip of tire building material onto the winding drum by rotating the winding drum and applying a defined pressure with a pressure roller during winding until a length of the strip of tire building material corresponding almost to the circumference of the winding drum has been wound onto the winding drum;

Stopping the rotating winding drum;

Fixing in a first location the strip of tire building material in the vicinity of a cutter bar that is positioned directly in front of the conveying device;

Moving a roller from an initial position toward the cutter bar along the circumference of the winding drum to thereby tighten the strip of tire building material and fix in a second location the strip of material closely adjacent to the first location; and Cutting the strip of tire building material with a cutting tool.

In a further embodiment of the present invention, the method step of fixing in the first location the strip of tire building material further comprises using a vacuum. Preferably, the roller is the pressure roller. Preferably, the step of cutting further comprises the step of using an ultrasonic cutting tool. Expediently, the step of cutting further comprises the step of transversely cutting the strip of tire building material.

In a further embodiment of the present invention, the method further comprises the step of adjusting the feeding speed of the conveying device to 2% less than the rotation speed of the winding drum, thereby tensioning and securing the strip of material on the winding drum.

Expediently, the inventive method further comprises the step of restarting the winding drum after completion of the cutting step so that the pressure roller applies the defined pressure to the cut end of the strip of tire building material wound onto the winding drum.

Advantageously, the step of simultaneously winding and applying a defined pressure further comprises the step of rotating the winding drum with the forward end of the strip of material placed thereon about at least 330°.

The inventive device for cutting to length a strip of tire building material is comprised of:

A rotatable winding drum for winding thereon the strip of tire building material until a length of the strip of tire building material corresponds almost to the circumference of the winding drum;

A conveying device positioned adjacent to the winding drum for feeding the strip of tire building material tangentially to the winding drum;

A pressure roller coordinated with the winding drum, the pressure roller applying a defined pressure to the strip of tire building material during winding of the strip of tire building material onto the winding drum;

A cutter bar connected between the winding drum and the conveying device so as to be positioned directly in front of the conveying device; and A cutting tool coordinated with the cutter bar, the cutting tool movable in a direction transverse to the strip of tire building material, wherein the strip of tire building material is cut by the cutting tool after being fixed in a first location in the vicinity of the cutter bar and the pressure roller is moved from an initial position toward the cutter bar along the circumference of the winding drum to thereby tighten the strip of tire building material and fix in a second location the strip of material closely adjacent to the first location.

Preferably the cutting tool is an ultrasonic cutting tool. Expediently, the device further comprises a vacuum device connected within the cutter bar for fixing the strip of tire building material at the first location. The cutter bar is preferably fastened to the conveying device. The cutting tool comprises a cutting knife positioned at an angle of between 5° and 30° relative to the horizontal.

Instead of providing a transverse cut it is also possible to use a cut in which the knife falls onto the strip of material in a so-called guillotine cut in a downward direction thereby cutting the entire width of the strip in one cut. Instead of the pressure roller tightening of the strip of material it is also possible to provide a separate roller for tightening the strip of material.

The present invention provides the advantage that a defined remaining length or short end portion (between the pressure roller and the cutting tool) resulting after the cut provides a reproducible material overlap, respectively, material assembly without producing a thickened overlap portion.

The invention is furthermore suitable for the automated manufacture of strips of material of a defined length, especially for materials that could not be effectively handled up to now. The inventive device can be easily integrated directly into an assembly line for producing vehicle tires. Furthermore, with the present invention the quality of the produced pneumatic vehicle tire can be improved and the amount of waste material can be reduced.

The gist of the invention lies essentially in the fact that the strip of material to be cut is tightened over a short remaining length and after the cutting step is directly applied to the winding drum. In order to achieve the required short remaining length or defined end portion a pressure roller is advanced along the circumference of the winding drum and positioned as closely as possible to the vicinity of the cutter bar so that between the cutting location and the pressure roller only a very short strip of material (remaining length or end position) remains. However, it must be ensured that the strip of material is not fixedly clamped between the pressure roller and the cutter bar in order to ensure a uniform tightening over the entire remaining length.

DESCRIPTION OF PREFERRED EMBODIMENTS

The present invention will now be described in detail with the aid of several specific embodiments, utilizing the only FIGURE.

The inventive device comprises a winding drum 1 which may be a tire building drum or an intermediate drum. The winding drum 1 has coordinated therewith a pressure roller 2 which is connected to a swivel arm 3 having a pivot point that is movably arranged so that the pressure roller 2 is movable along the circumference of the winding drum 1. Within the vicinity of the winding drum 1 a conveying device 4 with a conveyor belt 5 is positioned on which a strip of material 6, preferably tire building material is tangentially guided toward the winding drum 1. Directly in front of the conveying device 4 a cutter bar 7 is positioned between the winding drum 1 and the conveying device 4. The cutter bar 7 is provided with an exchangeable cutting strip 8 made of plastic material. A vacuum device 9 is integrated within the cutter bar 7 and serves to fix the strip of material 6 within the area of the cutting location 10. The cutter bar 7 as well as the pressure roller 2 with its swivel arm 3 may be connected to the frame of the conveying device 4. A cutting tool 11, which in the shown embodiment is an ultrasonic cutting tool, is arranged above the conveying device 4 such that the cutting knife 12 is positioned at an angle between 5° and 30° relative to the horizontal. For certain strips of material 6 it is also possible to use a conventional cutting system. When the strip of material 6 has a sufficient adhesiveness, the cutting knife 12 may also be positioned at a steeper angle so that the cutting surfaces, which later form the contacting surfaces for assembling the strip of material, can be smaller at the abutting location. The conveying device 4 as well as the cutting tool 11 are embodied such that they are retractable from the winding drum 1 in order to provide for an easy removal of the wound strip of material.

In the following the inventive method will be explained in detail. In the initial state, in which the forward end of the strip of material 6 is positioned at the cutting location 10, the winding drum 1 is stopped. The forward end of the strip of material 6 is engaged by a device, for example, a conventional vacuum device not represented in the drawing, and tangentially fed in the direction toward the winding drum 1. The forward end is then engaged by a vacuum device at the winding drum 1 or, in the alternative, when a cut strip of material is already positioned on the winding drum 1, the forward end of the material strip 6 sticks thereto because of its adhesive properties. Subsequently, the pressure roller 2 is advanced to apply a defined pressure onto the strip of material 6 on the winding drum 1 and the winding drum 1 is rotated. Accordingly, the strip of material 6 is wound onto the winding drum 1. The speed of the conveyor belt 5 of the conveying device 4 and the speed of the winding drum 1 may be synchronized with one another. Preferably, the winding drum 1 is rotated at a speed of 2% more than the conveying speed of the conveying device 4 so that the strip of material 6 is applied to the winding drum 1 with a uniform tension.

When the winding drum 1 has been rotated about approximately its circumference (to be more exact, about an angle of at least 330°, preferably 340° to 350°), the winding drum 1 and simultaneously the drive of the conveying belt are stopped. In this position, the forward end of the strip of material 6 is approximately located at the level of the cutting strip 8. The vacuum device 9 is activated so that the strip of material 6 is fixed within the area of the cutting location 10. If desired, a conventional device can be employed for fixing the strip of material within this area. The pressure roller 2 is now advanced along the circumference of the winding drum 1 in the direction toward the cutter bar 7 so that the strip of material 6 within the area between the cutting location 10 and the pressure roller 2 is tightened. This remaining strip length should be as short as possible; however, it must be ensured that the strip of material 6 is not fixedly clamped between the pressure roller 2 and the cutting strip 8. When the pressure roller 2 has reached its end position, the knife 12 of the ultrasonic cutting tool 11 is activated and the strip of material 6 is cut in a transverse direction. The pressure roller 2 essentially has two functions. On the one hand, the strip of material 6 already positioned on the winding drum is fixed with its present tension; on the other hand, the remaining length of the strip is uniformly tightened. Accordingly, a very exact cut can be performed. After the cutting step, the cut free ends of the strip of material at the cutting location open up so that the ends do not adhere to one another. Due to the very short remaining length it is also possible to take into consideration the subsequent shrinking so that in the following step of applying the remaining length onto the winding drum an exact abutting of the slanted ends is possible without creating gaps or thickened portions of the material due to excess overlap.

After the cutting step the winding drum 1 is again rotated so that the remaining length of the strip of material is applied thereto and pressed against it with the pressure roller 2. Now a first working cycle is finished, and the pressure roller 2 is retracted into its initial position.

The present invention is, of course, in no way restricted to the specific disclosure of the specification and drawings, but also encompasses any modifications within the scope of the appended claims.

What we claim is:

1. A method for cutting to length a strip of tire building material for layers in pneumatic vehicle, said method comprising the steps of:
   feeding a strip of tire building material via a conveying device tangentially to a winding drum;
   simultaneously winding the strip of tire building material onto the winding drum by rotating the winding drum and applying a defined pressure to the strip on the drum with a pressure roller during winding until a length of the strip of tire building material corresponding almost to the circumference of the winding drum has been wound onto the winding drum;
   stopping the rotating winding drum;
   fixing in a first location the strip of tire building material in the vicinity of a cutter bar that is positioned directly in front of the conveying device;
   moving the roller from an initial position toward the cutter bar along the circumference of the winding drum to thereby tighten the strip of tire building material and fix in a second location the strip of material closely adjacent to the first location; and
   cutting the strip of tire building material with a cutting tool.

2. A method according to claim 1, wherein said step of fixing in the first location the strip of tire building material further comprises using a vacuum.

3. A method according to claim 1, wherein a separate roller is provided to tighten the strip of tire building material.

4. A method according to claim 1, wherein said step of cutting further comprises the step of using an ultrasonic cutting tool.

5. A method according to claim 1, wherein said step of cutting further comprises the step of transversely cutting the strip of tire building material.

6. A method according to claim 1, further comprising the step of adjusting the feeding speed of the conveying device to 2% less than the rotation speed of the winding drum, thereby tensioning and securing the strip of tire building material on the winding drum.

7. A method according to claim 1, further comprising the step of restarting the winding drum after completion of the cutting step so that the pressure roller applies the defined pressure to the cut end of the strip of tire building material wound onto the winding drum.

8. A method according to claim 1, wherein said step of simultaneously winding and applying a defined pressure further comprises the step of rotating the winding drum with the forward end of the strip of tire building material placed thereon about at least 330°.

* * * * *